United States Patent Office 3,335,707
Patented Aug. 15, 1967

3,335,707
INTERNAL COMBUSTION ENGINES
Hans-Jochen Heinrich, Sandhausen, Germany, assignor to Motoren-Werke Mannheim AG, vorm. Benz Abt. Stat. Motorenbau, Mannheim, Germany
Filed Apr. 26, 1965, Ser. No. 450,919
Claims priority, application Germany, Apr. 25, 1964, M 60,790
4 Claims. (Cl. 123—30)

ABSTRACT OF THE DISCLOSURE

An inlet duct of a cylinder of a reciprocating internal combustion engine having a shape which promotes a rotary swirl of the intake air about the cylinder axis. This is effected in the inlet duct, which leads from a lateral surface of the cylinder head to an inlet valve, by the following cooperating features:

(1) Suitable positioning of the inlet valve port in the face of the cylinder head.

(2) Suitable sloping of the upper surface of the duct facing the inlet valve port.

(3) Suitable curvature of the portion of the duct lying adjacent to the inlet valve port and suitable width and relative positioning of that portion with respect to that port.

(4) Suitable shaping of the cross-section of the duct adjacent to the inlet valve port.

This arrangement gives a combination of vigorous swirl and high volumetric efficiency.

---

The invention relates to an inlet duct for an internal combustion engine, more particularly a diesel engine with direct injection and with a rotary movement of the combustion air in the cylinder, the inlet duct leading from an inlet port situated in a lateral surface of the cylinder head to an inlet valve situated eccentrically in the cylinder head.

An object of the invention is to produce a rotary movement of the combustion air in the cylinder, which gives an advantageous mixture formation as regards mean effective pressure, fuel consumption, exhaust gas turbidity and rate of pressure rise. According to the knowledge on which the present invention is based, an advantageous rotary movement of this kind should have the following qualities:

(1) Towards the end of the compression stroke the combustion air is to flow during the injection period substantially over the sector between the individual fuel jets from an approximately centrally arranged multi-hole injection nozzle.

In order to produce such an eddy about the cylinder axis, the air entering the cylinder must enter at the cylinder periphery. Since this eddy is established during the suction stroke and is left to be self-supporting over the greater part of the compression stroke, it has a tendency to take the form of a potential eddy, wherein the speeds of the individual air particles are inversely proportional to the radii of their orbits. Apparently the form of the piston trough is also very important, particularly if its diameter is substantially smaller than the cylinder diameter. In the latter case, the speed of rotation of the air in the trough is increased owing to wall friction substantially in accordance with the diameter ratio. A potential eddy does not fulfill the requirement mentioned under (1). This requirement is met only by a genuine eddy, wherein the particle speeds are proportional to the radii of their orbits. To produce such a genuine eddy which will still be in existence during the injection period, the eddy-establishing air flow issuing from the valve port must apparently be directed more outwardly towards the cylinder wall, i.e., not exactly tangentially.

(2) A part of the air issuing from the valve port is to be given a rotary movement about the valve axis.

This secondary eddy which is situated about the inlet valve axis apparently assists mixture formation in an advantageous manner. But it must not be so strong as to disturb the main eddy about the cylinder axis, and instead must only be secondary to this main movement about the cylinder axis.

According to the present invention, there is provided in combination, a cylinder for an internal combustion engine, a cylinder head of said cylinder, inlet valve means provided in said cylinder head, outlet valve means provided in said cylinder head and spaced from said inlet valve means about the axis of said cylinder, first portions of said cylinder head defining a lateral surface thereof directed outwardly, second portions of said cylinder head defining an inside surface thereof bounding an end of the working space of said cylinder, third portions of said cylinder head defining an inlet duct extending to said inlet valve means from said lateral face, fourth portions of said cylinder head defining a valve chamber of said inlet valve means to which chamber leads said inlet duct, and fifth portions of said cylinder head defining a valve seat of said inlet valve means and a valve port of said inlet valve means encircled by said valve seat, opening into said working space at said inside surface, and in communication with said valve chamber, the combination having the following features:

(a) A first radius extending from the axis of said cylinder and intersecting perpendicularly a connecting line which lies in a radial plane containing said first radius and which intersects the axis of said inlet valve means and the axis of said outlet valve means, and a second radius extending from the axis of said cylinder to the axis of said inlet valve means, include an angle of from 45° to 90°.

(b) A first surface of said chamber facing towards said port slopes towards said port from a second surface of said chamber, which surface is radially outer with respect to the axis of said cylinder, to a third surface of said chamber, which surface is radially inner with respect to the cylinder axis, and from there to a location in the vicinity of said seat, (c) When viewed in an axial direction of said cylinder, the centre line of a portion of said inlet duct adjacent to said valve chamber extends, in the intended direction of air flow in said duct, from a point of inflection adjacent to said first radius to a second point between said second surface and the inlet valve means axis but nearer to the inlet valve means axis than to said second surface, and (d) Said portion of said inlet duct is of a cross-section taken perpendicularly to said centre line of approximately the shape of a right-angle triangle with rounded corners of which the right-angle corner lies near to a surface of said portion which surface is radially outer with respect to the cylinder axis.

The aforesaid eddy formation is achieved by the combination of the features (a) to (d), which are in part known per se and will now be considered in more detail.

(a) This feature affords the advantage that the valves and the injection nozzle can be satisfactorily arranged in a two-valve diesel engine, the inlet valve having an eccentric position which is suitable for establishing the main eddy about the cylinder axis.

(b) This feature promotes the secondary eddy about the valve axis and forces the main eddy about the valve axis into a spirally downwardly directed path. Owing to the fact that the flow cross-section of the valve chamber decreases in the direction of the secondary eddy, the secondary eddy form is forced on only a part of the combustion air.

(c) This feature gives the more outwardly directed course for the entering air which was described in connection with condition (1), since the direction of the axially-viewed centre line of the duct portion which is situated immediately before the valve chamber determines to a considerable extent the direction of the air flow which stimulates the main eddy.

(d) The effect of this feature is that the main quantity of the entering air flows externally past the valve stem in accordance with the position of the area centre of gravity of the relevant cross-section, and effects the establishment of the main eddy about the cylinder axis in the most effective manner, i.e. by acting externally on the mass of air situated in the cylinder.

The transition from the inlet duct to the valve chamber is expediently so formed that, as seen in an axial direction of the cylinder, the duct portion situated immediately before the valve chamber has such a width measured at right angles to the centre line that its surface which is radially inner with respect to the cylinder axis intersects the valve chamber in a line lying between the inlet valve axis and the aforementioned third surface of the valve chamber.

The arrangement of a valve guide projecting unilaterally into the valve chamber is expediently facilitated in that the line of intersection between the valve chamber and the duct portion starts from the side nearer the cylinder axis of the line of intersection between a bore for the valve guide and that surface of the inlet valve chamber facing towards the inlet valve port, and, starting from this location, extends approximately helically into a region situated in the vicinity of the valve seat at the inlet side of the valve chamber.

Making the line of intersection end in this region assists the effect of features (b).

The effects of features (c) and (d) are advantageously assisted by the fact that the radially outer surface of that duct portion merges smoothly into the radially outer surface of the valve chamber within the contour of the inner periphery of the cylinder as seen in an axial direction of the cylinder.

In order that the invention may be clearly understood and readily carried into effect, reference will now be made by way of example to the accompanying drawings, in which.

Figure 1:
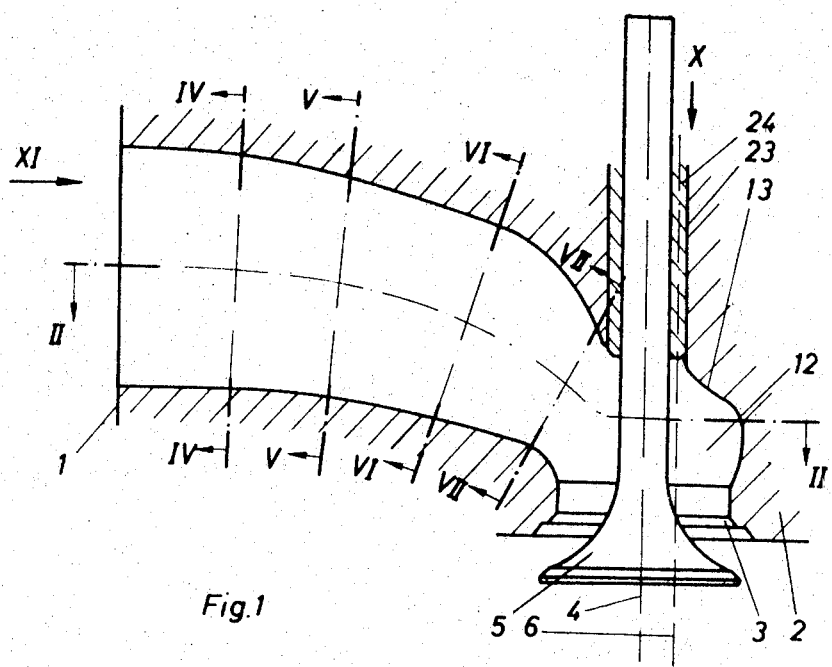
FIGURE 1 is a longitudinal vertical section taken on the line I—I of FIGURE 2 through an inlet duct of a cylinder head of a diesel engine.
Figure 2:
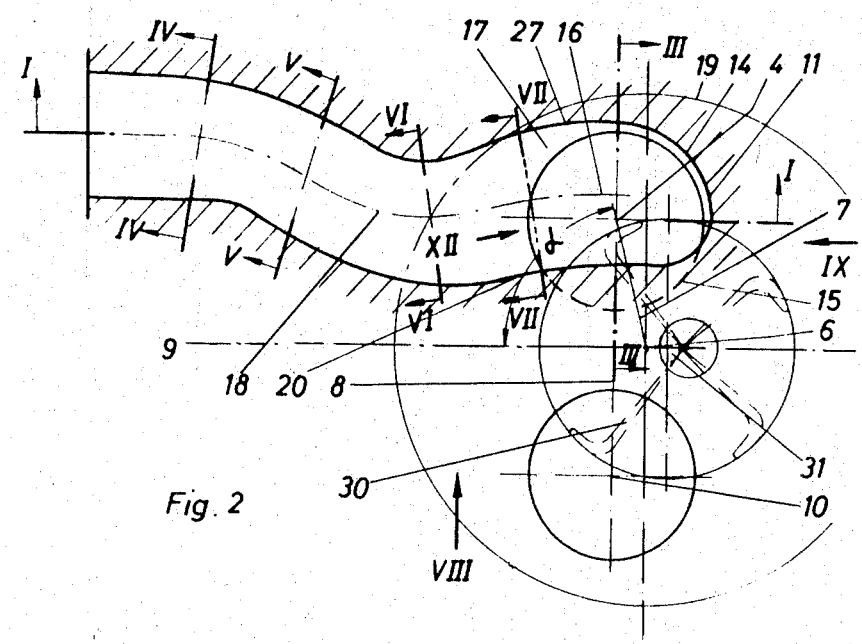
FIGURE 2 shows a longitudinal section taken on the line II—II of FIGURE 1.
Figure 3:
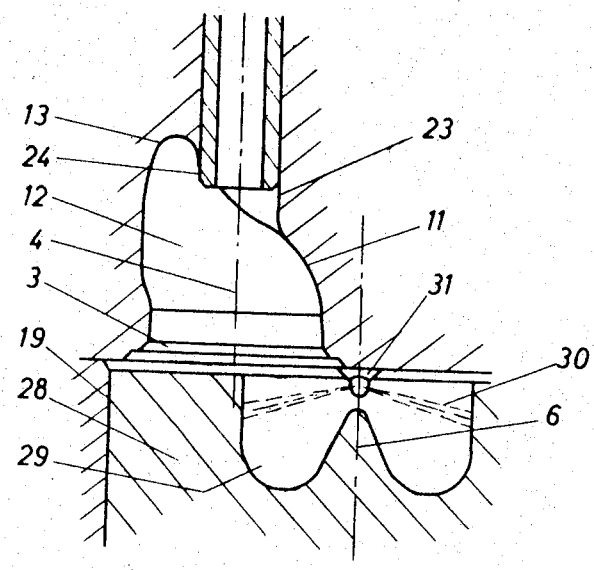
FIGURE 3 shows a cross-section taken on the line III—III of FIGURE 2.
Figure 4:
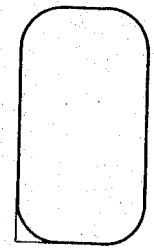
FIGURES 4 to 7 show cross-sections taken on the lines IV to VII of FIGURES 1, 2, 8 and 10 and FIGURES 8 to 11 are external views of the inside surfaces of the inlet duct, which are conceived as being infinitely thin, as viewed in the directions of the arrows VIII to XI, respectively.
Figure 5:
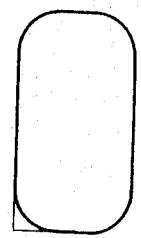
Figure 6:
Figure 7:
Figure 8:
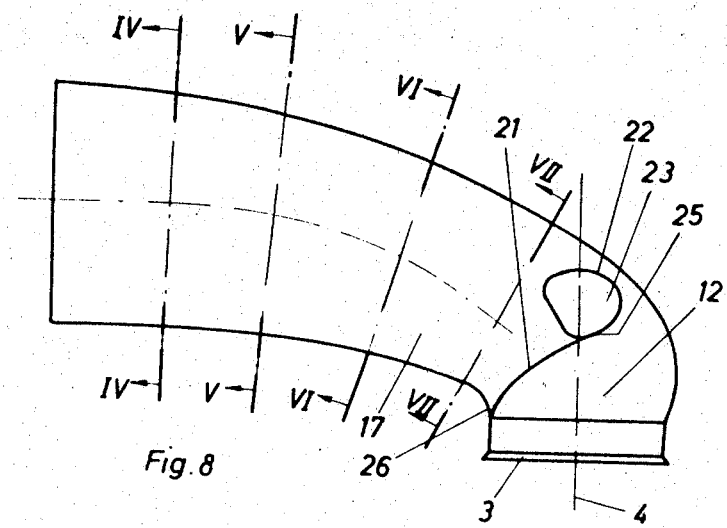
Figure 9:
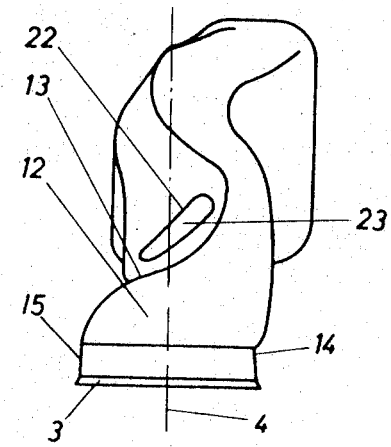
Figure 10:
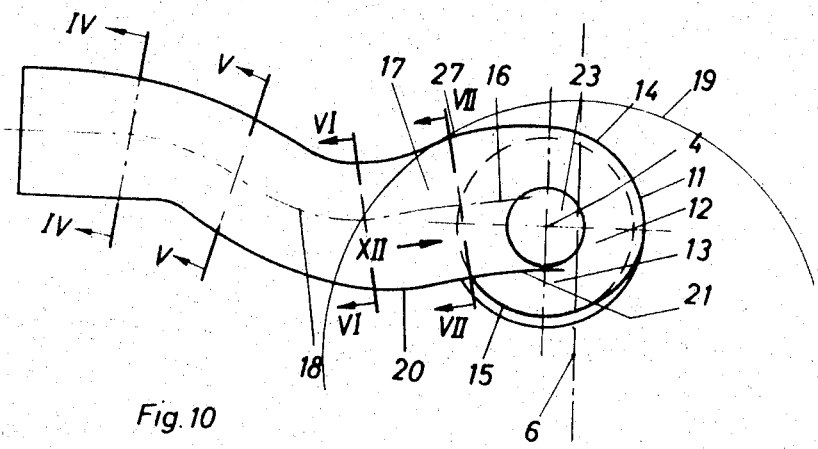
Figure 11:
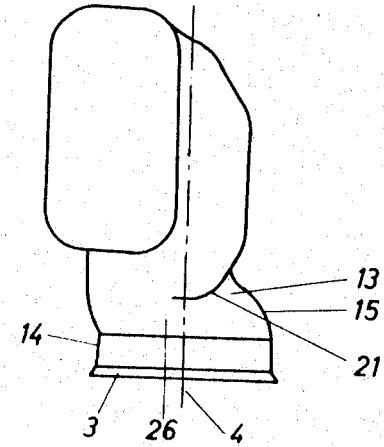

Referring to the drawings, the inlet duct leads from a lateral surface 1 of the cylinder head to an inlet valve chamber 12 connected to a port situated eccentrically in the cylinder head underside 2 and encircled by the valve seat 3. The axis 4 of the inlet valve 5 is situated parallel to the cylinder axis 6. A radius 7 extending from the axis 6 to the axis 4 forms an angle $\alpha$ of 77° with a radius 9 which extends, at right angles to a connecting line 8, from the axis 6 to the lateral surface 1. This angle $\alpha$ can lie within the range of 45° to 90°. The connecting line 8 connects the axis 4 and the axis 10 of an outlet valve of which merely the inlet port is illustrated. As FIGURES 2 and 3 show, the outer periphery 11 of the valve chamber 12 is larger than the inner periphery of the valve seat 3. The top surface 13 of the valve chamber 12 is shaped to slope helically from the radially outer surface 14 of the chamber 12 ("radially outer" with respect to the axis 6) to the radially inner surface 15 in the direction towards the valve seat 3. As seen in plan, the centre line 16 of the duct portion 17 situated immediately before the valve chamber 12 in the direction of flow XII of the entering air extends from a point of inflection 18 adjacent the radius 9 outwardly to the cylinder periphery 19 outside the inlet valve axis 4. The duct portion 17 is situated between the lines VI—VI and VII—VII. A section which is shown in FIGURE 7 and which is taken at right angles to the centre line 16 immediately before the mouth at which the portion 17 opens into the valve chamber 12, is approximately in the form of a right-angle triangle with rounded corners of which the right angle $\beta$ is situated in the vicinity of the valve seat 3 adjacent the radially outer surface 14. The plan of the duct portion 17 is of such a width, measured at right angles to the centre line 16, that its radially inner surface 20 with respect to the axis 6 intersects the valve chamber 12 at a line of intersection 21 situated between the inlet valve axis 4 and the radially inner surface 15 of the valve chamber. The line of intersection 21 starts from a location 25 at that side of a line of intersection 22 nearer to the cylinder axis 6, the line 22 being formed by a bore 23 for a valve guide 24 and the top surface 13 of the valve chamber 12, and extending substantially helically from this location 25 into a region situated in the vicinity of the valve seat 3 at the inlet side 26 of the valve chamber 12, as FIGURE 11 shows. The radially outer surface 27 (with respect to the axis 6) of the duct portion 17 merges smoothly into the surface 14 of the valve chamber 12 and is situated within an imaginary extension of the cylindrical inside surface 19 of the cylinder into the cylinder head. The inlet duct and the valve chamber and port co-operate with a combustion chamber trough 29 which is in the form of a body of revolution in the face of a piston 28 and which is offset slightly relatively to the cylinder axis 6 or is concentric therewith, and into which are directed a plurality of fuel jets 30, for example four, which are directed downwardly at a slight inclination to the horizontal, and which come from an injection nozzle 31 arranged concentrically or slightly eccentrically with respect to the combustion chamber trough 29 or the cylinder axis 6 in the cylinder head underside 2, and impinge on the side walls of the trough 29. The diameter of the combustion chamber trough 29 is substantially smaller than the diameter of the surface 19. Preferably, the trough diameter amounts to approximately half of the cylinder diameter.

I claim:

1. In combination, a cylinder for an internal combustion engine, a cylinder head for said cylinder, inlet valve means in said cylinder head, outlet valve means in said cylinder head and spaced from said inlet valve means about the axis of said cylinder, first portions of said cylinder head defining a lateral surface thereof directed outwardly, second portions of said cylinder head defining an inside surface thereof bounding an end of the working space of said cylinder, third portions of said cylinder head defining an inlet duct extending to said inlet valve means from said lateral surface, fourth portions of said cylinder head defining a valve chamber of said inlet valve means to which chamber leads said inlet duct, fifth portions of said cylinder head defining a valve seat of said inlet valve means and a valve port of said inlet valve means encircled by said valve seat, opening into said working space at said inside surface, and in communication with said valve chamber, a first radial line extending from the axis of said cylinder, a connecting line lying in a radial plane containing said first radial line, intersecting perpendicularly said first radial line and intersecting the axis of said inlet valve means and the axis of said outlet valve means, and a second radial line extending from the axis of said cylinder to the axis of said inlet valve means, said inlet duct including an inlet duct portion which is adjacent to said valve chamber and which has a surface portion which has a radially outwards location with respect to the cylinder axis, said fourth portions including a first surface portion facing towards said port, a second surface portion which has a radially outwards location with respect to the axis of said cylinder, and a third surface portion which has a radially inwards location with respect to the cylinder axis, the arrangement being such that (a) said first radial line and said second radial line include an angle of from 45° to 90°,
(b) said first surface portion slopes towards said port from said second surface portion to said third surface portion and from there to a location in the vicinity of said seat,
(c) when viewed in an axial direction of said cylinder, a center line of said inlet duct is formed by joining the centers of circles drawn in respective planes perpendicular to the cylinder axis and each tangential to two opposite contour lines drawn longitudinally of said third portions at respective opposite sides of said inlet duct portion and joining points where cross-sections through said inlet duct portion taken through said centers are of maximum dimension in said respective planes, said center line extending in the intended direction of air flow in said duct, from a point of inflection in the vicinity of the inner periphery of said cylinder to a second point between said second surface portion and the inlet valve means axis but nearer to the inlet valve means axis than to said second surface portion, and
(d) said inlet duct portion has a cross-section taken in the vicinity of said chamber perpendicularly to said center line of approximately the shape of a right-angle triangle with rounded corners of which the right-angle corner lies near to said surface portion of said inlet duct portion.

2. The combination according to claim 5, further comprising a second surface portion of said inlet duct portion which has a radially inwards location with respect to the cylinder axis, and a line of intersection at which said second surface portion of said inlet duct portion intersects said valve chamber, whereby (e) as seen in said axial direction, said inlet duct portion has such a width measured perpendicularly to said center line that said line of intersection lies between the inlet valve means axis and said third surface portion.

3. The combination according to claim 6, further comprising sixth portions of said cylinder head defining a bore of said inlet valve means extending axially of said inlet valve means and leading to said vlave chamber at a location opposite to said valve port for receiving a guide sleeve for a valve stem of said valve means, and a second line of intersection between said bore and said first surface portion of said chamber, the arrangement being such that (f) the first-mentioned line of intersection begins at a location on said second line of intersection and describes an approximately helical path ending at a location in the vicinity of said seat and of said inlet duct portion.

4. The combination according to claim 5, wherein said surface portion of said inlet duct portion merges smoothly with said second surface portion of said chamber within the inner periphery of said cylinder as seen in said axial direction.

References Cited

UNITED STATES PATENTS

| 2,318,915 | 5/1943 | Anderson et al. | 123—30.2 |
| 3,008,458 | 11/1961 | Eisele et al. | 123—30.2 |
| 3,020,896 | 2/1962 | Meurer et al. | 123—30.2 |
| 3,270,733 | 9/1966 | Steidler | 123—30.2 |

FOREIGN PATENTS

| 838,196 | 6/1960 | Great Britain. |

LAURENCE M. GOODRIDGE, *Primary Examiner.*